United States Patent [19]
Scheele

[11] 3,743,044
[45] July 3, 1973

[54] ELEVATING PLATFORM TRANSPORTER
[75] Inventor: Wesley W. Scheele, San Jose, Calif.
[73] Assignee: FMC Corporation, San Jose, Calif.
[22] Filed: June 7, 1971
[21] Appl. No.: 150,480

[52] U.S. Cl................ 180/41, 180/22, 180/24.11, 180/44, 214/512, 280/6 H
[51] Int. Cl............................................. B60g 19/06
[58] Field of Search...................... 214/512; 180/22, 180/24, 24.02, 24.08, 24.09, 24.11, 41; 280/6 R, 6.1, 6.11, 124 F, 6 H, 111, 112

[56] References Cited
UNITED STATES PATENTS
1,990,798  2/1935  Richter et al. ...................... 280/6 H
3,328,019  6/1967  Wilson ............................... 280/6 R
2,623,758  12/1952  Cruz ................................ 280/6.1 X
3,525,534  8/1970  Madler et al. ...................... 180/41 X
1,937,062  11/1933  Kellett ............................. 280/6 H X

*Primary Examiner*—Albert J. Makay
*Attorney*—F. W. Anderson, C. E. Tripp, G. M. Polumbus and R. S. Kelly

[57] ABSTRACT

An article transport vehicle for loading and unloading cargo aircraft has an elevating article-supporting bed which carries on its underside power means for adjusting the disposition of the bed and power means for motivating the vehicle. The bed is uniquely supported on tandem wheel-carrying axles so that it can be elevated to any desirable level and still be stabilized with respect to vertical, side, or fore and aft loads. The bed also possesses roll and pitch capabilities for use on uneven terrain.

4 Claims, 16 Drawing Figures

FIG_6

FIG_7

FIG_8

FIG_14

FIG_15

FIG_16

FIG_10

FIG_11

FIG_12

FIG_13

ELEVATING PLATFORM TRANSPORTER

BACKGROUND OF THE INVENTION

1. Field of the Invention

The present invention is generally concerned with transport vehicles but more particularly concerns a transport vehicle with an elevating bed for loading or unloading cargo aircraft.

2. Description of the Prior Art

Applicant is aware of only one prior art vehicle adapted for loading and unloading cargo aircraft that is similar to the vehicle of the present invention. That vehicle has a base frame extending the length of the vehicle adjacent the ground to which frame the suspension system and power train are attached. The frame also serves as a support for scissors-type linkages that carry an elevating article-supporting bed. The disposition of the article-supporting bed is controlled by hydraulic cylinders which also give the bed roll and pitch capabilities. The elevation of the frame from the ground is fixed, however, so that the vehicle is limited in use to relatively smooth terrain. This sometimes renders the vehicle useless at remote airport facilities, such as frequently used by the military, where it is necessary that the vehicle traverse rough and normally unprepared terrain.

SUMMARY OF THE INVENTION

The transport vehicle of the present invention is particularly adapted for loading and unloading cargo aircraft. At many aircraft facilities, particularly military facilities, these vehicles must frequently travel over uneven and sometimes rough terrain in transporting cargo to or from an aircraft. It is, therefore, important that they have considerable ground clearance, elevational adjustability, and roll and pitch capabilities.

The vehicle herein disclosed has two wheel assemblies which support, through a unique suspension system, an article-supporting bed or platform. The wheel assemblies can either be single axle or, in the preferred embodiment described hereinafter, double axle. The suspension system includes power means for controlling the vertical disposition as well as the roll and pitch of the supporting bed. It also includes means to stabilize the vehicle with respect to side, or fore and aft loads. The suspension system is secured to the underside of the supporting bed and moves with the bed so that, when the vehicle is traversing uneven or rough terrain, the bed can be elevated to increase ground clearance.

In addition to the suspension system, all of components of the motive power means and the other power systems used in the vehicle, including the hydraulic system, power means and transmission for driving the vehicle, fuel tank, and batteries, are secured to the supporting bed and are elevated with it. This arrangement eliminates the need for a separate vehicle frame as used on the hereinbefore described prior art vehicle. By eliminating the separate frame, the dsign of the vehicle is simplified and the overall weight reduced.

Accordingly, it is an object of the present invention to provide a transport vehicle having an elevatable bed which vehicle is capable of carrying large loads and traversing rough and uneven terrain.

It is another object to provide a vehicle with an elevating article-support bed wherein the components of the motive power means, such as the drive train, fuel tank, batteries, and the like, are secured to the bed, thereby eliminating the need of a separate vehicle frame.

DESCRIPTION OF THE PREFERRED EMBODIMENT

Figures 1, 9:
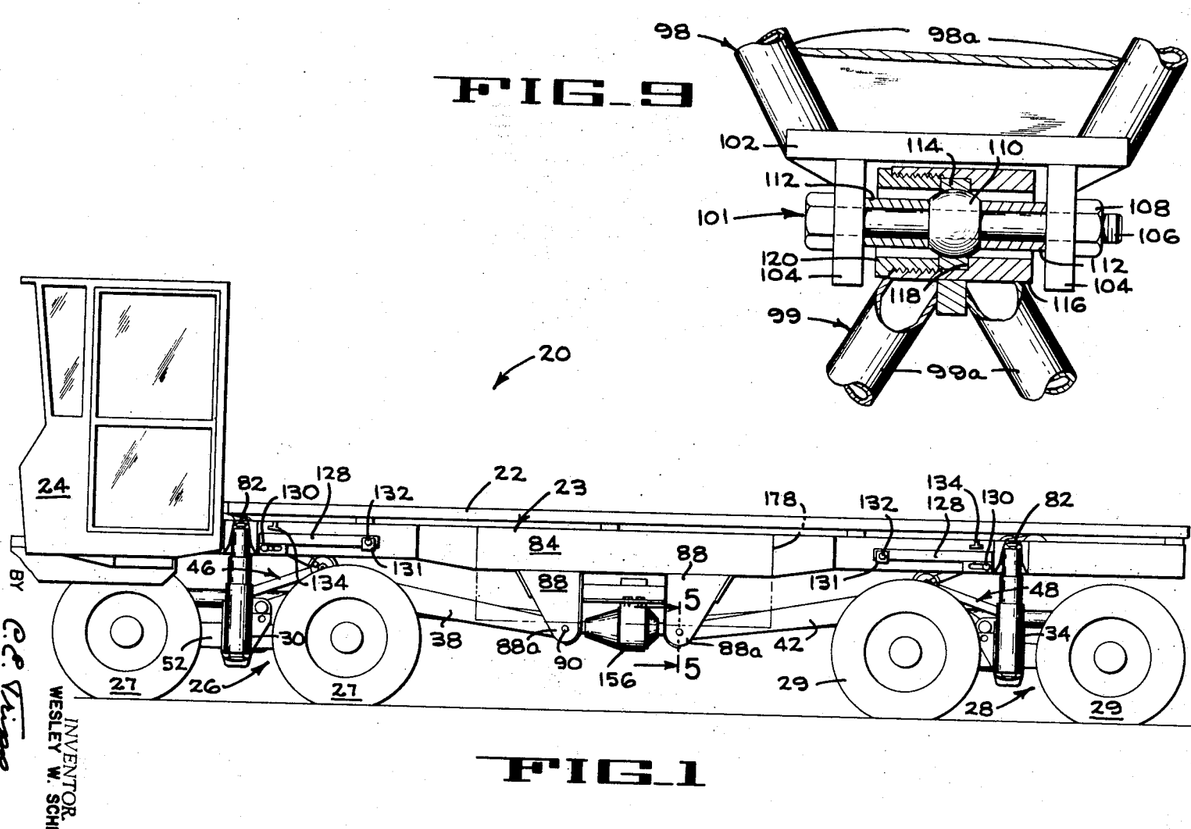
FIG. 1 is a side elevation of the transport vehicle of the present invention.
FIG. 9 is an enlarged fragmentary view with parts in section showing a ball universal used in the transport vehicle of FIG. 1.

The elevating platform transporter 20 of the present invention is seen in its normal driving position in FIG. 1 and includes a load supporting platform or bed 22 on a frame 23, a cab 24 mounted on the platform for the operator of the vehicle, a front truck 26 having four wheels 27 and a rear truck 28 having four wheels 29. It is contemplated, however, that the trucks could be replaced by single-axle wheel assemblies, each having two spaced wheels, without departing from what is considered the subject matter of the invention. The trucks 26 and 28 support the platform 22 through a suspension system including four telescoping hydraulic cylinders 30, 32, 34 and 36 (FIG. 2) which react against all vertical loads, four swing beams 38, 40, 42 and 44 (FIG. 2) which react against all fore and aft loads, and two folding supports 46 and 48 which react against all side loads.

Figure 2:
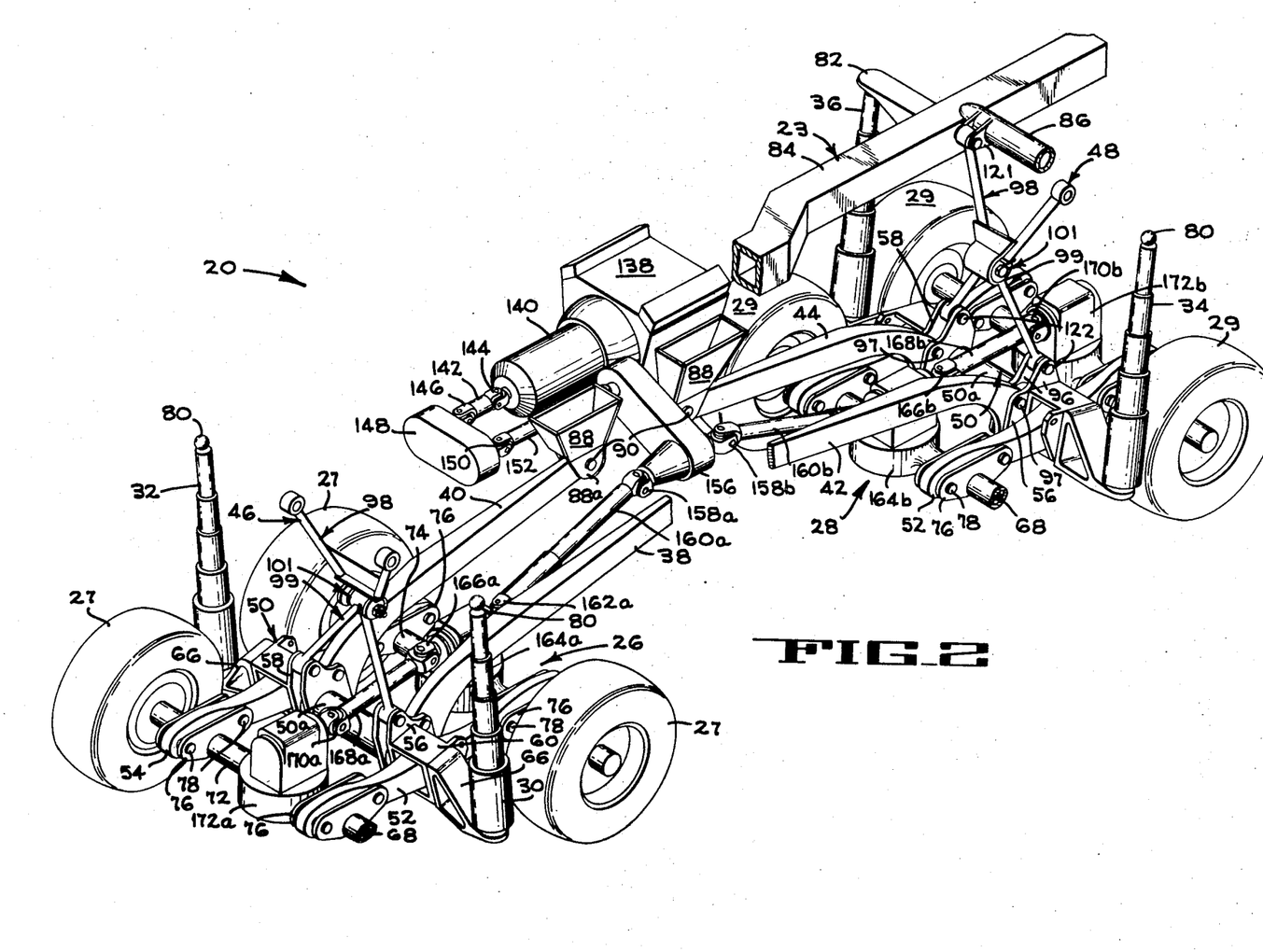
FIG. 2 is a diagrammatic isometric view of the vehicle of FIG. 1 with parts of the vehicle broken away or removed for clarity.
Figures 3, 4, 5:
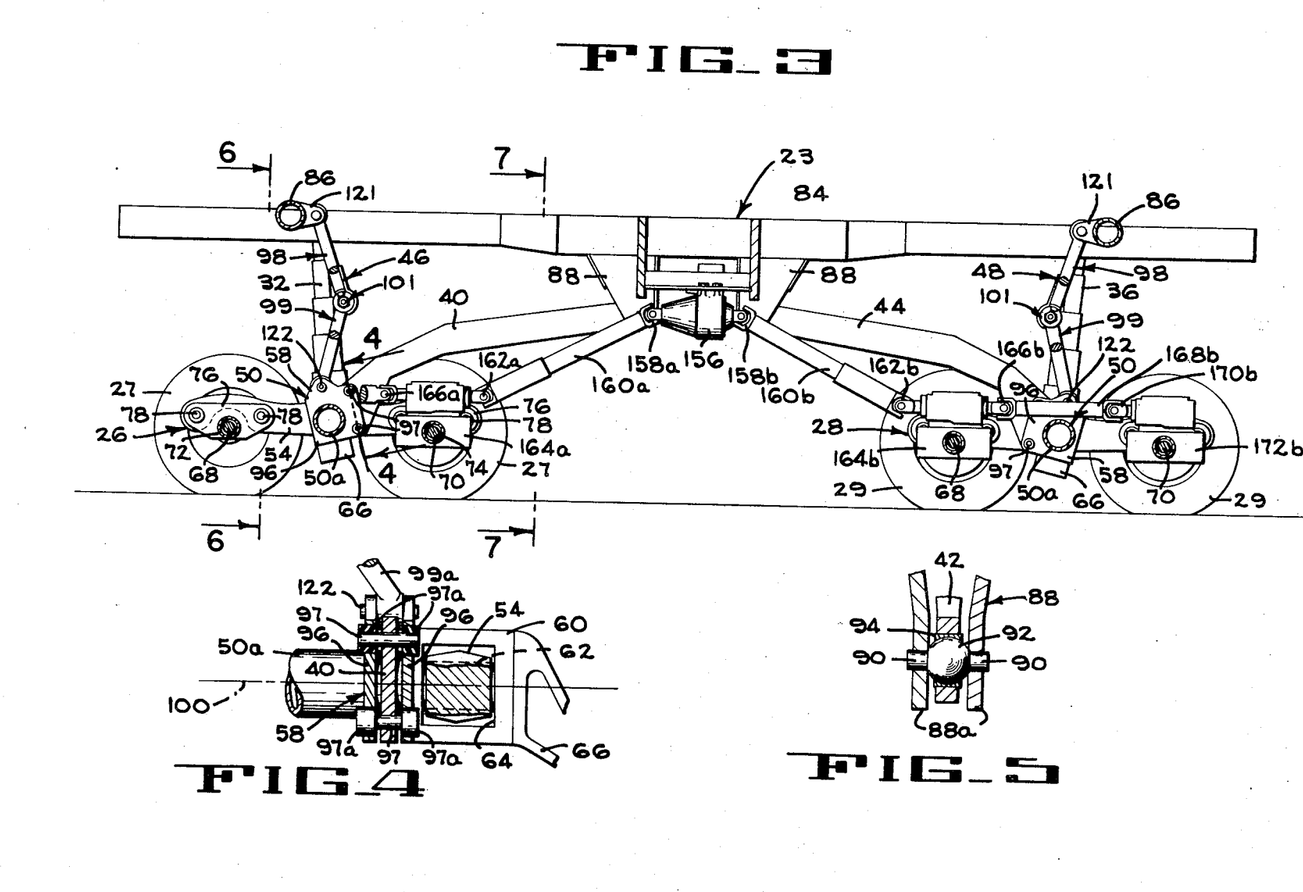
FIG. 3 is a longitudinal section through the vehicle of FIG. 1.
FIG. 4 is an enlarged fragmentary section taken along line 4—4 of FIG. 3.
FIG. 5 is an enlarged fragmentary section taken along line 5—5 of FIG. 1.
Figure 6:
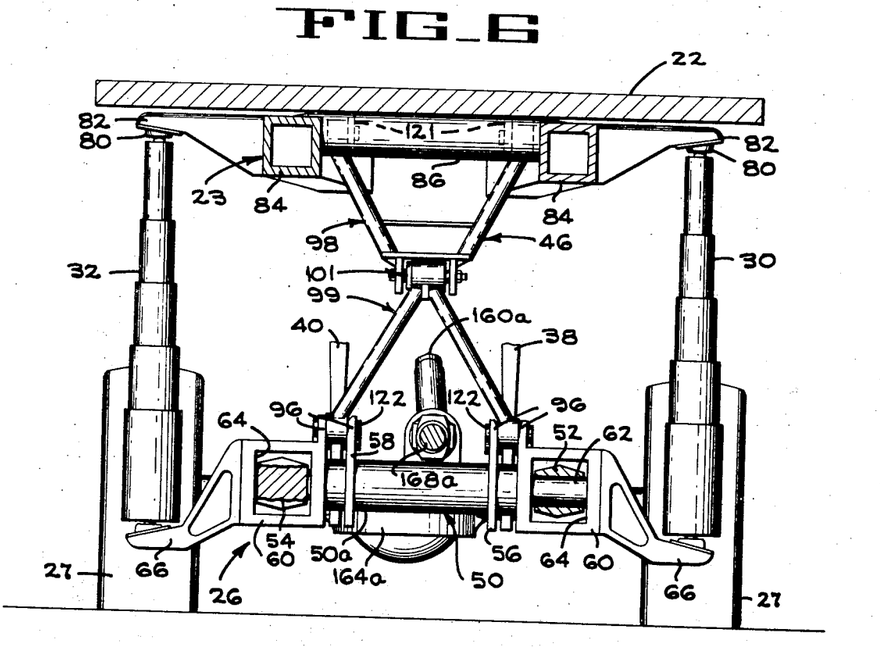
FIG. 6 is an enlarged section taken along line 6—6 of FIG. 3.
Figure 7:
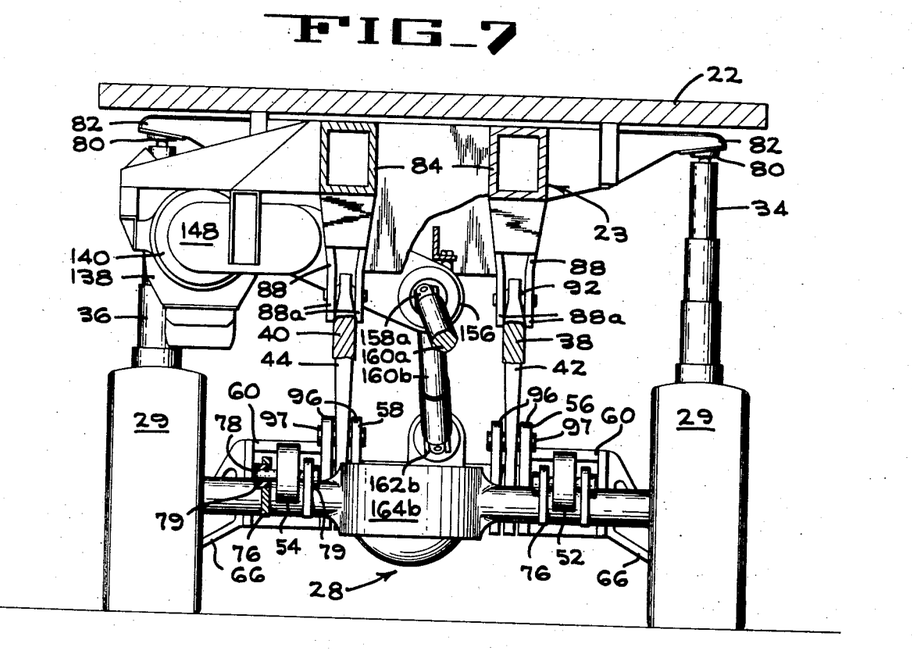
FIG. 7 is an enlarged section taken along line 7—7 of FIG. 3.

The trucks 26 and 28 are identical and each can be seen, in FIG. 2, to include a central cross member 50 which pivotally supports a pair of identical supporting arms 52 and 54. The cross member 50 (FIG. 6) can be seen to have a cylindrical central portion 50a with mounting brackets 56 and 58 rigidly attached to and extending upwardly from the ends of the cylindrical portion. The purpose of the brackets 56 and 58 will become more apparent with the description hereinafter. Outwardly from and integral with the brackets 56 and 58, and also a part of the cross member 50, are supporting portions for the supporting arms 52 and 54. With reference to FIG. 4 each of these supporting portions can be seen to comprise a substantially square shaped frame 60, when viewed in cross section, with an integral horizontal shaft 62 extending within a passage 64 in the frame. Each of the arms 52 and 54 has a central cylindrical bore therethrough which receives one of the horizontal shafts 62 so that the arm is free to rock back and fourth about the shaft. Integral with the outermost portions of the square frames 60 and constituting the ends of the cross member 50 are substantially triangular shaped portions 66 which are adapted to seat the telescoping hydraulic cylinders 30, 32, 34 and 36 as will be explained in more detail later.

Each truck has two wheel supporting axles (FIGS. 2 and 3), a front axle 68 and a rear axle 70. The axles 68 and 70 are rotatably positioned in axle housings 72 and 74, respectively, which completely enclose the axles. Each axle housing carries two pair of brackets 76 for anchoring the axle housings to the ends of the supporting arms 52 and 54. The brackets 76 are all identical and have spaced pairs of rubber bushings 79 which tightly receive metal pins 78 that extend through the bushings in the brackets and through the associated ends of one of the supporting arms. It can be seen in FIG. 2 that the brackets 76 of each pair are axially spaced from each other so that the end of one of the arms 52 or 54 will loosely fit therebetween. The rubber bushings are strong and durable yet slightly flexible to allow a small amount of relative movement between the ends of the supporting arms and the brackets 76. This small amount of relative movement allows the wheels of each truck to remain in contact with the ground regardless of the disposition of the remaining wheels whereby the transporter 20 can negotiate fairly rough terrain with all wheels in positive engagement with the ground.

Figure 8:
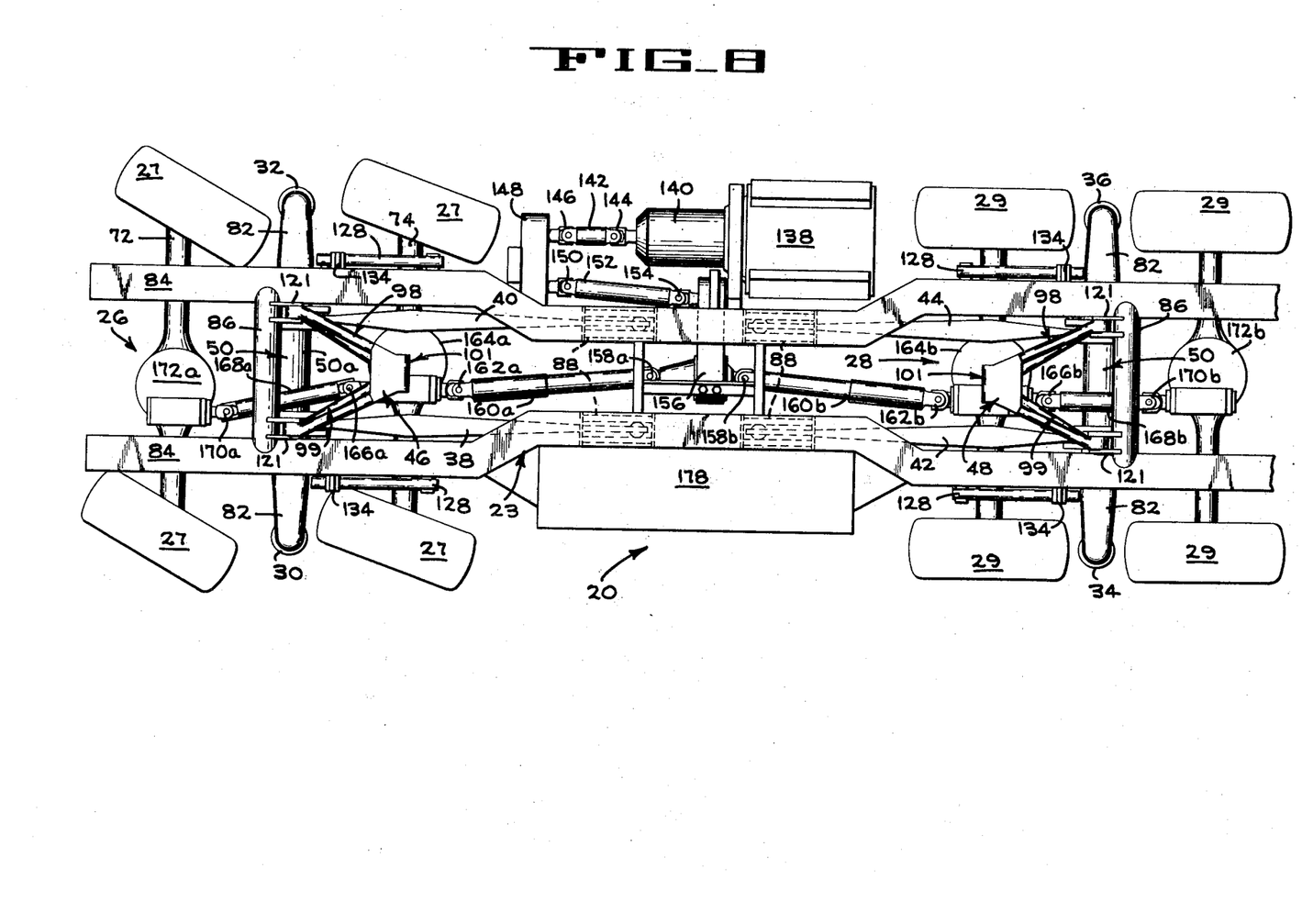
FIG. 8 is a plan view of the vehicle of FIG. 1 with the support platform removed for clarity.

As pointed out before, the triangular end portions 66 of the cross members 50 seat the lower ends of the telescoping hydraulic cylinders 30, 32, 34 and 36. Each cylinder is connected to its associated triangular portion by a ball universal (not shown) so that the cylinders are capable of moving universally above their associated cross member. The upper extensible ends of the hydraulic cylinders are also provided with ball universals 80 which connect the cylinders to brackets 82. The brackets 82 extend outwardly from longitudinal frame members 84 of the frame 23 which are tied together at their ends in spaced relationship by crossbars 86 (FIGS. 2 and 8). Inasmuch as the frame 23 directly supports the platform 22, as pointed out before, it can be seen that the orientation of the platform 22 can be manipulated by adjustment of the hydraulic cylinders as will be more fully explained later.

Each of the swing beams 38, 40, 42 and 44, which react against fore and aft loads to stabilize the transporter, is connected at one end to a bracket 88 (FIGS. 1, 2 and 5) that depends from a longitudinal frame member 84 near its longitudinal center. Each bracket 88 is provided with spaced downwardly extending ears 88a (FIG. 5) which support diametrically extending protrusions 90 of a steel pivot ball 92. The ends of the swing beams that are supported by the brackets 88 are provided with a bearing 94 which has a concave low friction face that is adapted to fit around the ball 92 to allow universal movement of the swing beam. The universal movement, however, is partially limited in the horizontal plane by the downwardly extending ears 88a of the brackets 88. The opposite ends of the swing beams are mounted one each on the brackets 56 and 58 of the front truck 26 and brackets 56 and 58 of the rear truck 28. This mounting can best be seen in FIGS. 3 and 4 wherein the brackets 56 and 58 are seen to include spaced mounting plates 96 between which the end of a swing beam can be loosely fitted. The swing beams are connected to the plates 96 by metal pins 97 that extend through strong and durable rubber bushings 97a which are somewhat flexible. The pins 97 may be identical to the previously described pins 78 used with the brackets 76 on the axle housings 72 and 74. The brackets 56 and 58, therefore, allow a small amount of relative movement in the ends of the swing beams for reasons that will become clear later. It will be evident, however, from what has been described that, when the hydraulic cylinders 30, 32, 34 and 36 are extended to elevate the platform 22, the ends of the swing beams will pivot at one end about the associated balls 92 and, at their other end, will cause the central cross member 50 of each truck 26 and 28 to pivot about a longitudinal axis 100 (FIG. 4). This pivotal movement will not put any kind of an undue strain on the hydraulic cylinders because, as pointed out before, the cylinders are connected to the cross members by ball universals.

The transporter is stabilized with regard to side forces by the folding supports 46 and 48. Each folding support comprises an upper V-shaped member 98 and a lower V-shaped member 99 (FIG. 6) which are connected at their apex by a ball universal 101. The ball universal 101 is best seen in FIG. 9. The apex of the legs or struts 98a of each of the upper V-shaped members 98 includes an integral bracket member 102 with two depending ears 104 which support a horizontally disposed bolt 106 that is secured to the ears by a nut 108. The bolt in each universal 101 carries at its midpoint an oblate-spheroidally shaped ball 110 which is positioned on the bolt by cylindrical spacers 112 also carried by the bolt. A bearing 114 having a spherical inner surface encircles the ball 110 in each universal 101 and fits into a bearing support member 116 at the apex of the legs 99a of the associated lower V-shaped member. The bearing support member 116 is cylindrically shaped and has a longitudinal opening therethrough so that it can encircle the bolt 106. One end of the member 116 is internally threaded and the central internal portion of the member has an annular shoulder 118 for seating the bearing 114. The bearing is held in the support member 116 by a threaded retainer 120. It can be seen that the universal 101 will limit relative lateral movement of the V-shaped members 98 and 99 because the bearing 114 will contact the spacers 112 when approximately 5° of movement in either lateral direction (or a total maximum movement of 10°) has occurred. The universal, however, provides complete freedom of movement in the longitudinal direction so that the upper and lower V-shaped members can fold toward each other when it is desired to lower the platform 22 of the transporter.

The legs 98a of the upper V-shaped members 98 are pivotally connected to the cross bars 86 of the frame 23 by bracket-pin assemblies 121 (FIGS. 2 and 8). The legs 99a of the lower V-shaped members 99 are pivotally connected to the brackets 56 and 58 on the cross members 50 by pins 122. Thus, it will be seen that the supports 46 and 48 will stabilize the transporter with regard to side forces; yet, these members are capable of folding to allow vertical movement of the platform 22.

Figure 11:
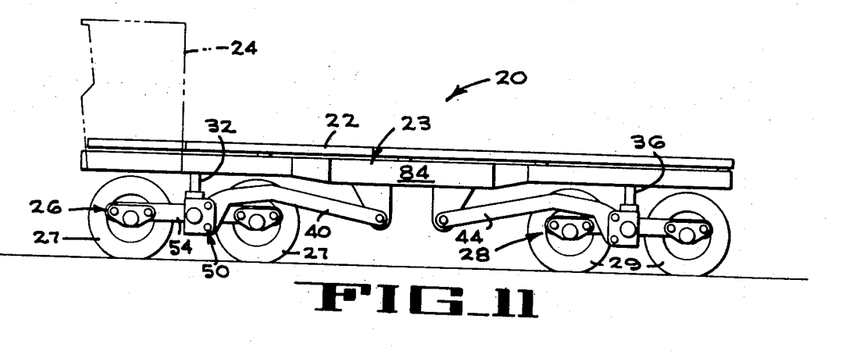
FIG. 11 is a diagrammatic side elevation of the transport vehicle with the article supporting platform in its normal travel position.
Figure 12:
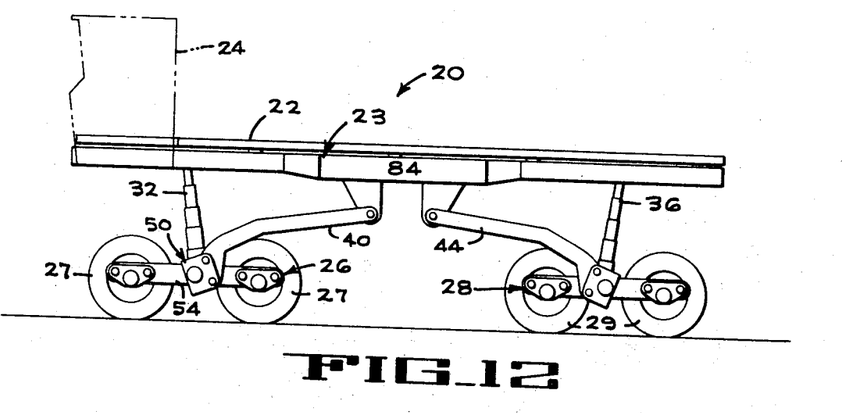
FIG. 12 is a diagrammatic side elevation of the transport vehicle with the article supporting platform in a raised position.
Figure 13:
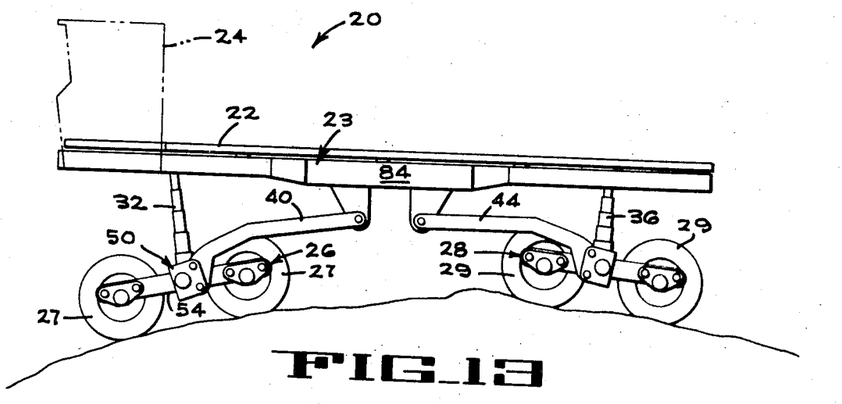
FIG. 13 is a diagrammatic side elevation of the transport vehicle illustrating its capability of negotiating uneven terrain.
Figure 15:
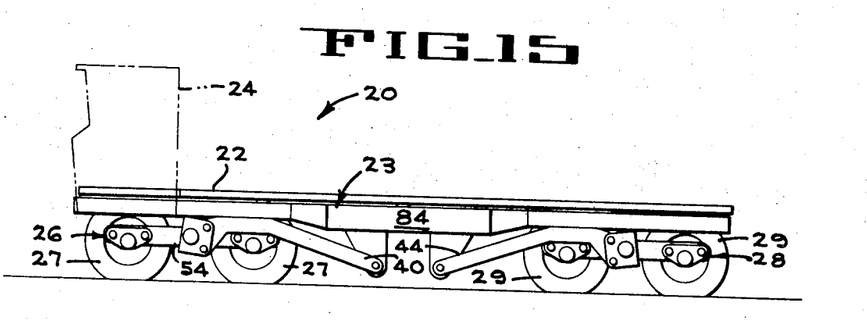
FIG. 15 is a diagrammatic side elevation of the transport vehicle with the article supporting platform in its lowermost position.

It is apparent from the above description of the suspension system, which includes the hydraulic cylinders 30, 32, 34 and 36, the swing members 38, 40, 42 and 44, and the folding supports 46 and 48, that the platform 22 can be raised or lowered simply by extending or retracting the telescoping cylinders. The vertical disposition of the platform 22 under usual traveling conditions is shown in FIG. 11 wherein it is seen that there is normal clearance between the frame of the vehicle and the ground. The platform 22 is shown in an elevated position in FIG. 12. The elevated position is useful when unloading cargo planes or the like where it is desirable that the loading platform be level with the door opening of the plane. The elevated position of the platform is also useful when the transporter is negotiating uneven terrain as depicted in FIG. 13. It can be seen that the trucks 26 and 28 move closer to each other when the platform is raised. FIG. 15 shows the platform 22 in its lowermost position wherein it is positioned only about 38 inches off the ground. In this position the platform off the be easily manually unloaded inasmuch as it is at about waist level for most workers.

Figure 16:
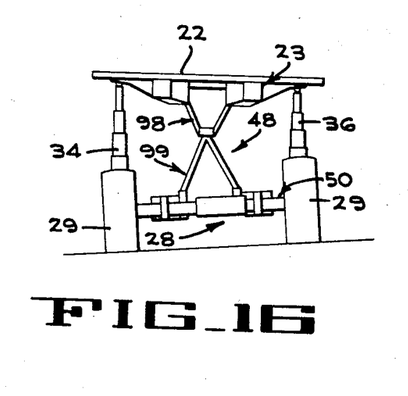
FIG. 16 is a diagrammatic end elevation of the transport vehicle illustrating a roll position of the article supporting platform.

In addition to being vertically movable, the platform has roll and pitch capabilities which enable the transporter to negotiate various types and degrees of uneven terrain. In order to roll the platform to one side as in FIG. 16, it is only necessary to extend the hydraulic cylinders on one side of the transporter, e.g., cylinders 32 and 36 can be extended while leaving stationary or retracting the cylinders 30 and 34. It is important to note that the folding supports 46 and 48 have lateral pivotal capabilities which enables the upper V-shaped member 98 of each support to pivot laterally with respect to the lower V-shaped member 99 as shown in FIG. 16. It is also important to note that the swing beams 38, 40, 42 and 44 have a small amount of flexibility in their mountings at one end and are universally mounted at the other end so as not to restrict the roll of the platform 22 as long as it is kept within a predetermined range. This range is substantially limited to about 5° from the vertical in either direction or a total of 10° maximum movement in correspondence to the limited lateral pivotal movement of the folding supports 46 and 48.

Figure 14:
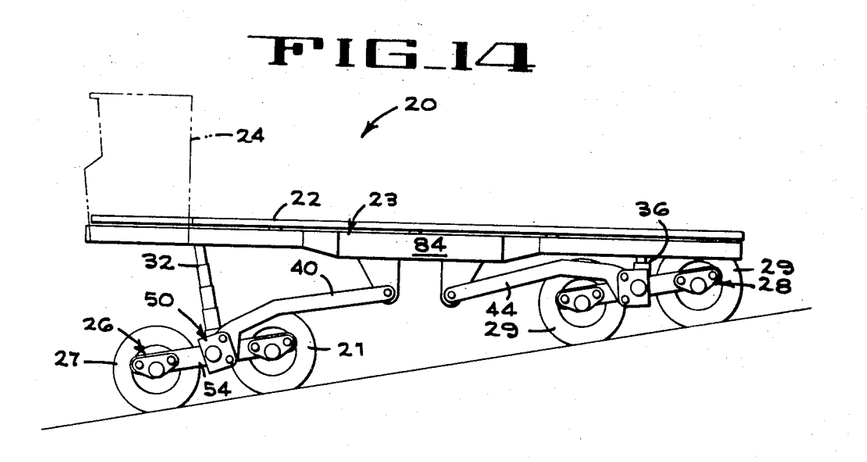
FIG. 14 is a diagrammatic side elevation of the transport vehicle illustrating a pitched position of the article supporting platform.

To pitch the platform 22 in one direction as in FIG. 14, it is only necessary to extend the forward hydraulic cylinders 30 and 32, while leaving stationary or retracting the rear hydraulic cylinders 34 and 36. Of course, to pitch the platform in the opposite direction a reverse procedure is followed.

It will be apparent that as the platform is moved vertically, the spacing between the trucks 26 and 28 will vary due to the rigidity and set length of the swing beams. This will in no way, however, bind the supports 46 and 48 because of their pivotal attachments to the associated truck and the frame 23, nor will it bind the hydraulic cylinders inasmuch as they are connected to the trucks and the frame by ball universals.

Although not specifically disclosed herein, it is contemplated that the hydraulic cylinders 30, 32, 34 and 36 can be controlled for the above mentioned movements, plus lockup of individual cylinders in a plurality of extended and contracted positions by any of several known types of control systems; examples of comparable controls are disclosed in U.S. Pat. Nos. 3,183,016 and 3,254,738.

Figure 10:
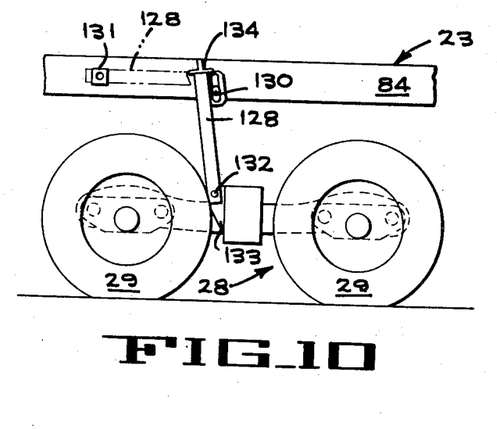
FIG. 10 is a fragmentary side elevational view of a portion of the transport vehicle showing a supporting maintenance strut.

To support the frame 23 during certain maintenance operations, rigid struts 128 (FIG. 10) are provided on the side of the frame 23 adjacent each hydraulic cylinder. The struts are pivoted at one end about a pivot pin 130 that is attached to the frame member 84 so that the other end can be swumg up and received in a bracket 131 that is also attached to the frame member. The strut is removably connected to the bracket (FIG. 1) by a removable pin 132. When it is desired to fix the platform in a certain elevated position, each strut can be swung down and connected to a bracket 133 on the adjacent truck 26 or 28 by the pin 132, as shown in FIG. 10, and the upper end of the strut will thereby be positioned to receive a flat abutment surface on a support bracket 134 which is attached to the frame member 84 in order to provide a stable support for the frame.

The transporter is powered by an engine 138 (FIGS. 2 and 8) which is secured to the underside of the platform 22 adjacent one side thereof and approximately midway between the front and the rear of the transporter. A transmission 140 is operably connected to the front of the engine 138 and is adapted to rotate a drive shaft 142 through a universal joint 144. The drive shaft 142 is connected through a universal joint 146 to the input of a first transfer box 148 which has an output connected through a universal joint 150 to a drive shaft 152. The drive shaft 152 is connected through a universal joint 154 to the input of a second transfer box 156. The output of the second transfer box is bilateral and drives, through universal joints 158a and 158b, a pair of drive shafts 160a and 160b, respectively. The drive shafts 160a and 160b are connected through universal joints 162a and 162b, respectively, to the input of gear housings 164a and 164b, respectively, which have gears that are adapted to rotate the rear axle 70 of the front truck 26 and the front axle 68 of the rear truck 28, respectively. Each of the gear housings 164a and 164b have outputs that drive, through universal joints 166a and 166b respectively, drive shafts 168a and 168b, respectively. The drive shafts 168a and 169b are connected through universal joints 170a and 170b, respectively, to gear housings 172a and 172b, respectively, which have gears that are adapted to rotate the front axle 68 of the front truck 26 and the rear axle 70 of the rear truck 28, respectively. Thus, it can be seen that, through the above described drive train, the engine 138 drives each of the eight-wheels of the vehicle. It should also be noted that, since the vertical spacing between the platform 22 and the trucks 26 and 28 is regulatable, it is necessary that the drive shafts 160a and 160b be extensible. Accordingly, each of the drive shafts 160a and 160b have telescoping male and female members that are splined to transmit rotative movement.

The transporter is provided with a conventional hydraulic steering system which is not shown. Only the wheels on the front truck 26 are effected by the steering, as can be evidenced in FIG. 8 where the wheels 27 on the front truck are shown turned in one direction.

In FIG. 8 a housing 178 is shown bracketed to the longitudinal frame member 84 that is on the opposite side of the vehicle from the engine 138. The housing 178 is disposed beneath the platform 22 and is used to cover the hydraulic reservoir, the hydraulic power components, the fuel tank and batteries.

Accordingly, a transport vehicle has been described having an article supporting platform that has roll and pitch capabilities as well as the capability to be moved vertically. It is apparent that there is only one frame on the vehicle and that that frame is movable with the supporting platform so that a large ground clearance is obtainable. Thus, the vehicle is capable of negotiating almost any type or degree of uneven or rough terrain thereby making the vehicle very useful for unloading cargo planes at remote airports, such as used by the military, where the unloading facilities are not as elaborate and well planned as are most commercial airports.

Although the best mode contemplated for carrying out the present invention has been herein shown and described, it will be apparent that modification and variation may be made without departing from what is regarded to be the subject matter of the invention.

What is claimed is:

1. A transport vehicle comprising a substantially rectangular platform having front and rear ends, a wheel assembly under each end of the platform with at least one wheel being generally positioned below each of the corners of the platform, motive power means supported by said platform, a flexible drive train connecting said power means to one of said wheel assemblies, a powered extensible member positioned directly between each of said wheels and said platform, universal connecting means securing one end of each extensible member to said platform and the other end to the associated wheel assembly, and a pair of swing beams for stabilizing said vehicle against forces in an end to end direction, each of said swing beams having one end pivotally connected to a wheel assembly adjacent one end of said platform and the other end pivotally connected to the longitudinal central portion of said platform, said swing beams pivoting relative to said platform as said platform is elevated and moving the wheel assemblies at the opposite ends of said vehicle closer together, and means for individually locking said extensible members in a plurality of extended and contracted positions so as to permit said vehicle to traverse non-level terrain while retaining said platform in a generally horizontal attitude.

2. A transport vehicle according to claim 1 including flexible means for pivotally connecting said swing beams to said wheel assemblies and said platform so as to permit a restricted amount of pivotal movement between said swing beams and the remainder of the vehicle structure in a plane transverse to said end to end direction.

3. A transport vehicle according to claim 1 including four upper and four lower struts respectively positioned two at each end of said platform, means for pivotally connecting one end of each lower strut to one of said wheels assemblies, means for pivotally connecting one end of each upper strut to said platform adjacent one of the corners thereof, means for rigidly interconnecting the free ends of said lower struts together and the free ends of said upper struts together, and means connecting each of the two upper struts to the adjacent two lower struts at each end of the platform to permit pivotal movement between the struts in both a longitudinal plane and a transverse plane.

4. A transport vehicle comprising an elongate load carrying platform having front and rear ends, a wheel assembly positioned beneath each end of said platform, individual swing beams connecting the front and rear wheel assemblies to the longitudinally central portion of said platform to resist fore and aft movement of said platform while accommodating relative vertical movement between said wheel assemblies and said platform, individual folding support frames connecting the front and rear wheel assemblies to said platform to resist lateral movement while accommodating relative vertical movement between said wheel assemblies and said platform, each of said folding support frames including an upper and a lower member interconnected by a hinge, said hinge including means for allowing limited transverse tilting of one of said members relative to the other, the pivot axis of said hinge means extending transversely of said platform so that said hinge accommodates relative vertical movement between said platform and said wheel assemblies, and a pair of laterally spaced fluid operated cylinders supporting said platform from each of said wheel assemblies for regulating the vertical height of said platform.

* * * * *

UNITED STATES PATENT OFFICE
CERTIFICATE OF CORRECTION

Patent No. 3,743,044          Dated July 3, 1973

Inventor(s) WESLEY W. SCHEELE

It is certified that error appears in the above-identified patent and that said Letters Patent are hereby corrected as shown below:

Column 1, line 51, after "of" insert --the--.

Column 1, line 59, "dsign" should be --design--.

Column 5, line 36, after "platform" delete "off the" and insert --can--.

Column 6, line 56, "169b" should be --168b--.

Signed and sealed this 1st day of April 1975.

(SEAL)
Attest:

RUTH C. MASON
Attesting Officer

C. MARSHALL DANN
Commissioner of Patents
and Trademarks